No. 804,396. PATENTED NOV. 14, 1905.
H. J. GRELL.
MILK HEATER.
APPLICATION FILED MAY 4, 1905.
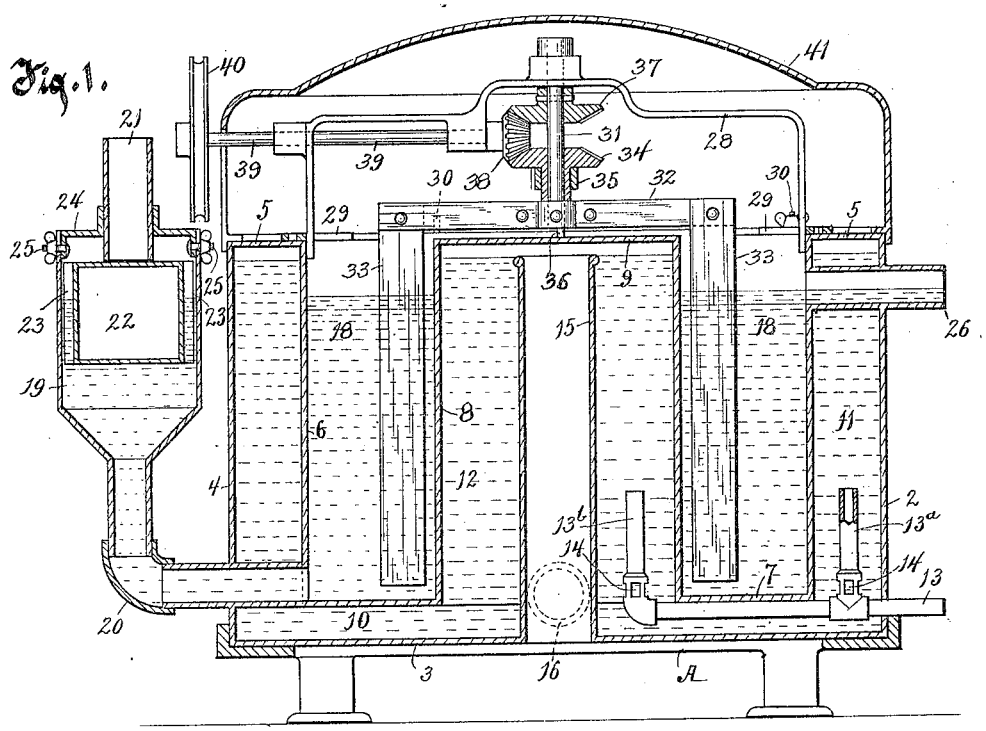
Fig. 1.
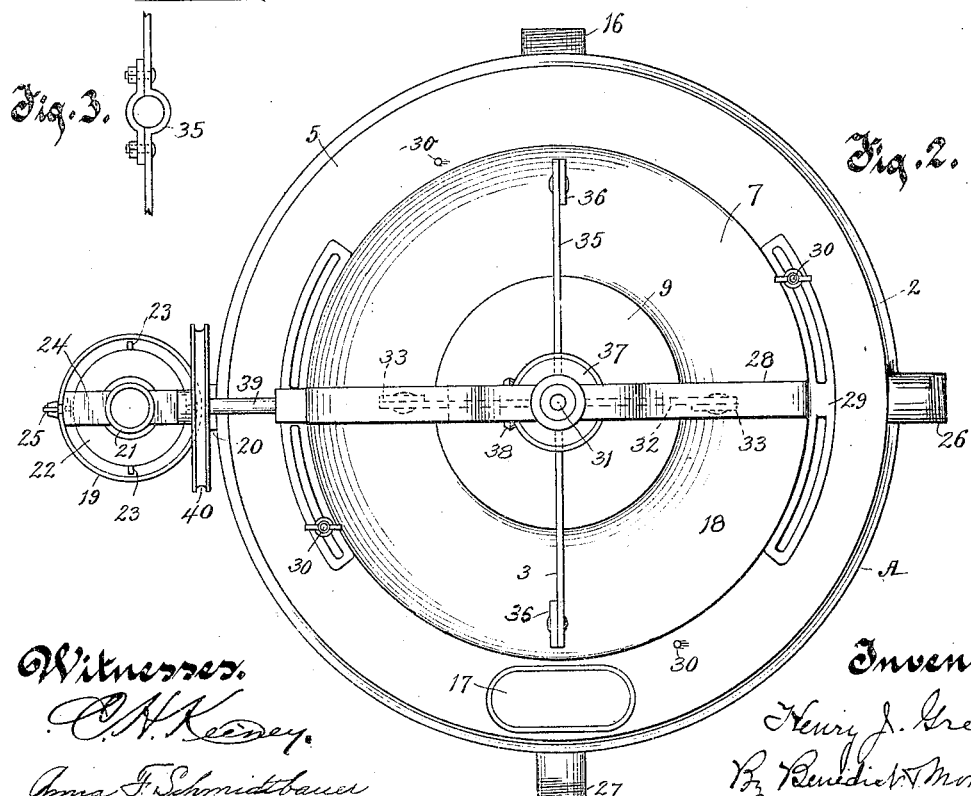
Fig. 3.
Fig. 2.
Witnesses.
C. H. Keeney.
Anna F. Schmidtbauer.
Inventor.
Henry J. Grell
By Benedict & Morsell
Attorneys.

UNITED STATES PATENT OFFICE.

HENRY J. GRELL, OF JOHNSON CREEK, WISCONSIN.

MILK-HEATER.

No. 804,396.  Specification of Letters Patent.  Patented Nov. 14, 1905.

Application filed May 4, 1905. Serial No. 258,781.

*To all whom it may concern:*

Be it known that I, HENRY J. GRELL, residing in Johnson Creek, in the county of Jefferson and State of Wisconsin, have invented new and useful Improvements in Milk-Heaters, of which the following is a description, reference being had to the accompanying drawings, which are a part of this specification.

My invention relates to an apparatus adapted for heating milk or cream therein either for pasteurizing purposes or otherwise, the degree of heat to which the milk or cream is raised being dependent on the purposes for which the heat is applied and may be to any extent above the normal condition of the milk or cream to such heat as would boil the milk or cream, if desired, though such extreme heat is not necessary for the purposes for which heat is usually applied to milk or cream.

The invention consists of the apparatus, its parts, and the combinations thereof, as herein described and claimed, or the equivalents thereof.

In the drawings, Figure 1 is a vertical central section of my improved apparatus. Fig. 2 is a plan view of the apparatus, and Fig. 3 is a detail of construction.

The apparatus is advisably constructed in a form that makes it portable, and I have so shown it in the drawings.

In the drawings, A is a base adapted to rest on a floor or other suitable support and to support the improved apparatus.

The apparatus includes a water receptacle or tank 2, advisably made of sheet metal and preferably of galvanized sheet-iron, there being a circular or disk-like bottom 3, from which there projects upwardly at or near the circular edge thereof an annular wall 4, which at the top is carried inwardly horizontally a little distance, as shown at 5, and is then extended downwardly to near the bottom, forming an interior annular wall 6, and at the lower end of this wall 6 the wall is extended inwardly parallel with the bottom 3, forming an interior bottom 7, and at the inner edge of this interior bottom 7 the wall is again carried upwardly, forming a second interior upright annular wall 8, which at its upper end is continued into the lateral or horizontally-disposed closing top wall 9, which wall 9 is advisably substantially on a horizontal plane with the top wall 5. This construction forms a substantially closed water receptacle or tank consisting of the lower horizontally-disposed chamber 10, having a horizontal extent substantially equal to the horizontal extent of the receptacle, and an outer upright annular chamber 11 and an inner and central upright chamber 12. A pipe 13 leads into the water-chamber 10 and is provided with discharge-pipes $13^a$ $13^b$, respectively opening in the chambers 11 and 12 and advisably with ports 14 near the junction of the pipes $13^a$ and $13^b$ with the pipe 13. The pipe 13, with its discharge-ports $13^a$, $13^b$, and 14, is adapted to lead water or steam, or both, into the water-chambers. An overflow-pipe 15, fixed in and opening through the bottom 3, extends up to and is open at near the top of the inner water-chamber 12 and is adapted to permit of the overflow and escape of water from the water-chamber when it has raised to the top of the pipe. A discharge-port 16 is provided near the bottom of the chamber for drawing off or discharging water therefrom for cleaning out the water-chamber, which discharge-port when the chamber is in use will be closed in any suitable manner. Also a hand-hole 17 is provided in the top of the receptacle for access thereto for filling, discharging, or cleaning purposes.

As will be observed, the structure as thus described forms an intermediate annular receptacle or chamber 18, closed at the bottom by the bottom wall 7 and annularly at each side thereof by the walls 6 and 8, respectively, which chamber is adapted to receive and hold temporarily the milk or cream therein while it is being heated by the radiation of heat thereto from the surrounding water. For introducing the milk into the chamber 18 I provide a receptacle in the nature of a milk-hopper 19, discharging downwardly through the pipe 20, which pipe leads through the outer water-chamber 11 into the intermediate milk-chamber 18 near the bottom thereof. A pipe 21 leads into the top of the hopper 19 and is adapted to supply the milk thereto. In the hopper 19 there is a hollow float-valve 22, adapted to rest on the milk or liquid in the hopper and by its buoyancy to be supported and lifted thereby to such extent that when the hopper has received and supplied to the milk-chamber all the milk it should contain the float will be forced upwardly against and will thereby close the lower end of the inlet-pipe 21. Vertically-disposed and laterally-projecting wings 23 on the sides of the float-valve 22 by contacting with the sides of the hopper are adapted to keep the float-valve in position to travel vertically in the hopper.

The inlet-pipe 21 is secured rigidly in the bracket 24, which fits onto the top of the hopper 19, and is secured adjustably, vertically, and releasably thereto by bolts 25 with thumb-nuts thereon. The milk-chamber 18 is provided with an overflow and outlet port 26, advisably in that side opposite the inlet-port 20, leading from the tank 18 through the exterior water-chamber 11, and is adapted to discharge the milk from the chamber 18 when the milk therein rises to the height of this outlet-port. The purpose is to allow milk to flow into the heating-tank with approximate continuousness and to be heated therein and to be as readily and continuously discharged therefrom, the float-valve 22 preventing an excess or undesirable supply of milk in the tank 18. A discharge and clean-out port 27 is provided, leading from the chamber 18 to the outside of the chamber 11, which is normally closed in any suitable manner and is utilized for the purpose of washing and cleaning the milk-tank.

For stirring or agitating the milk, cream, or liquid of whatever character that is in the chamber 18 mechanical means are provided as follows: A detachable ancillary frame 28, constructed principally of a bar or strap of steel, is so bent and shaped as to provide a substantially horizontal medial portion with two downwardly-extending terminal leg portions, which leg portions are advisably so arranged as to fit on the inside at diametrically opposite points against the inner surface of the annular wall 6 at the top, and the legs are each provided with a curved bracket or foot 29, which foot is adapted to rest on the top of the top horizontal wall 5 of the receptacle and is secured in place adjustably and so as to be shiftable revolubly limitedly thereon by means of a bolt 30 with a nut, which bolt is fixed in the top wall 5 and passes through an elongated slot therefor in the foot 29 and by means of which the foot is clamped adjustably and removably to the receptacle. In the line of the axis of the annular chamber 18 a shaft 31 is mounted revolubly in the frame 28 and depends therefrom, and radial arms 32, fixed on the shaft, extend laterally to over the chamber 18, and paddles or blades 33, fixed on the arms, project therefrom downwardly into the chamber 18 to near the bottom thereof. A beveled gear-wheel 34, loose on shaft 31, rests by its hub on the top surface of the arms 32 about the shaft, and other radial arms 35, substantially similar to the radial arms 32, are secured to the hub of the gear-wheel 34 and project therefrom, preferably at a right angle to the arms 32, and other paddles or blades 36, similar to the blades 33, depend therefrom into the chamber 18, the blades 36 being at a greater distance from the shaft 31 than the blades 33 and being so disposed that when the arms are revolved the blades 35 will move around in the chamber 18 in a path outside the path of the revolving blades 33. Another beveled gear-wheel 37 is fixed on the shaft 31, and a pinion 38 on the horizontal shaft 39 meshes with the two gear-wheels 34 and 37, rotating them in reverse directions, whereby the blades 33 and 36 are correspondingly revolved in opposite directions in the liquid-chamber 18. The shaft 39 has its bearings and is thereby mounted in the frame 28 and is provided with a pulley 40, by means of which the shaft is rotated from a source of power-supply. A removable cover 41 incloses the top of the receptacle, the ancillary frame, and the mechanism for rotating the blades.

As before stated, my improved apparatus is adapted and is intended to be used especially in creameries for heating milk or cream; but the apparatus may be used for other purposes—as, for instance, in the summer for cooling milk and cream—and in such case, instead of introducing hot water or steam into the receptacle through the pipe 13 cold water is supplied, and ice may be put into the water-chambers through the hand-hole 17, thereby still further lowering the temperature of the water, thus securing a cooling or modifying of the temperature of the milk or cream to a lower degree instead of raising it, as is done where hot water or steam is used.

Not only may the apparatus be used for modifying the temperature of milk or cream, but any other liquid the temperature of which is desired to be modified can be put into the liquid-chamber 18 of the receptacle and the temperature thereof can be modified either up or down in the manner hereinbefore set forth.

What I claim as my invention is—

1. An apparatus for modifying the temperature of liquid, consisting of a water-chamber including a bottom chamber, an upright central circular chamber and an upright exterior annular chamber, an annular liquid-receptacle between the upright water-chambers and above the bottom water-chamber, the central water-chamber being as high as or higher than the surrounding annular liquid-receptacle and means in the liquid-receptacle for agitating the liquid therein.

2. An apparatus for modifying the temperature of liquid, consisting of a water-chamber including a bottom chamber, an upright central circular chamber and an upright exterior annular chamber of substantially the same height, an annular liquid-receptacle between the upright water-chamber and above the bottom water-chamber of no greater height than the central and exterior water-chambers, and means for supplying liquid to the liquid-receptacle substantially continuously and for permitting the liquid to be discharged in a corresponding continuous amount therefrom.

3. In an apparatus for modifying the temperature of liquid, a stationary central circular upright water-chamber closed at its top, a stationary exterior annular upright water-chamber closed at its top the two water-chambers being of the same height and connected together by a passage for water at the bottom, a water-supply pipe leading thereto, an upright discharge-pipe in the central water-chamber open near the top of the chamber to receive and carry off the water from said chamber, an annular liquid-receptacle open at the top between and formed by the walls of the inner and the outer water-chambers and substantially of the same height as the two water-chambers, a frame having legs and a connecting cross-bar at their upper extremities the legs being secured detachably to the exterior water-chamber, a vertical shaft in the frame, a pinion and radial arms above the central chamber fixed on the shaft, a pinion with radial arms loose on the shaft above the central water-chamber, blades depending from both sets of radial arms into the liquid-receptacle, and means for rotating the two sets of radial arms and their blades concurrently in reverse directions.

4. In an apparatus for modifying the temperature of liquid, a liquid-receptacle, an abutting and surrounding water-chamber, a hopper discharging into the liquid-receptacle, an inlet-pipe adjustable up and down in the hopper a float-valve in the hopper arranged to close the lower end of the inlet-pipe and thereby to control the inflow of liquid to the hopper, and a port disposed opposite the supply-port to discharge liquid near the top of the liquid-chamber and in a plane slightly below that at which the inflow is closed by the float-valve.

5. In an apparatus for modifying the temperature of liquid, a substantially closed water-chamber including a bottom chamber an upright central chamber and an exterior upright annular chamber, a supply-pipe leading into the bottom chamber and having branches extending into and opening in the upright chambers adapted to supply the chambers with a liquid temperature-modifying medium.

6. In an apparatus for modifying the temperature of liquid, a central closed-top water-chamber, an annular liquid-holding chamber no higher than the central water-chamber, an abutting and surrounding water-chamber, a detachable frame mounted on the exterior water-holding chamber, a vertically-disposed rotatable shaft mounted in the frame, radial arms above the central chamber fixed on the shaft, blades on the arms depending into the liquid-holding chamber, other radial arms above the central chamber loose on the shaft, blades on the loose arms depending into the liquid-holding chamber, and means for revolving the sets of arms and blades in reverse directions.

7. In an apparatus for modifying the temperature of liquid, a receptacle structure, comprising a substantially closed water-chamber including a bottom horizontally-disposed chamber, a central upright chamber closed at its top, an upright overflow-pipe in the central chamber and open at its top near to but just below the top of the central chamber and discharging through the floor of the bottom chamber, and an annular upright exterior water-chamber of substantially the same height as the central water-chamber, a water-supply pipe leading into the water-chamber, an annular liquid-chamber formed in said receptacle above and by the top wall of the bottom water-chamber and between the central upright chamber and the exterior annular water-chamber and of a little less height than the central and exterior upright water-chambers, blades depending into the annular liquid-chamber, and means for supporting and revolving the blades.

8. In an apparatus for modifying the temperature of liquid, a stationary combined water and open-topped annular milk receptacle, an ancillary frame attachable to the receptacle, a shaft mounted in the ancillary frame, radial arms fixed on the shaft above the milk-receptacle, radial arms above the milk-receptacle loose on the shaft, blades depending from both sets of arms into the annular milk-chamber, and means for revolving the two sets of arms in the chamber.

9. In an apparatus for modifying the temperature of liquid, a combined water and annular liquid receptacle, an ancillary frame resting on and attached to the receptacle, means permitting the adjustment of said frame to different positions revolubly on the receptacle, a shaft mounted in the ancillary frame, radial arms fixed on the shaft above the receptacle, radial arms above the receptacle loose on the shaft, blades depending from both sets of arms into the annular liquid-chamber, and means for revolving the two sets of arms in opposite directions.

In testimony whereof I affix my signature in presence of two witnesses.

HENRY J. GRELL.

Witnesses:
  F. W. GRELL,
  F. R. SCHOLL.